Patented Nov. 20, 1928.

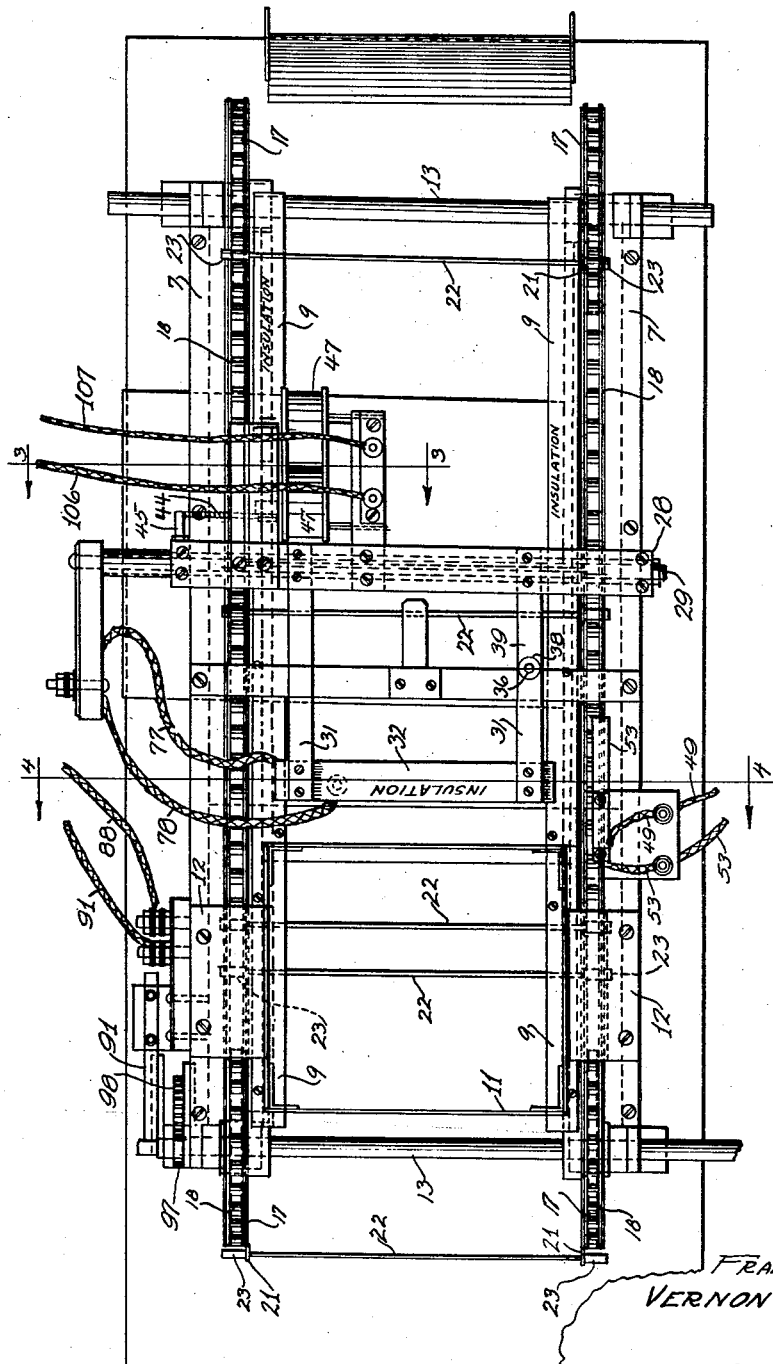

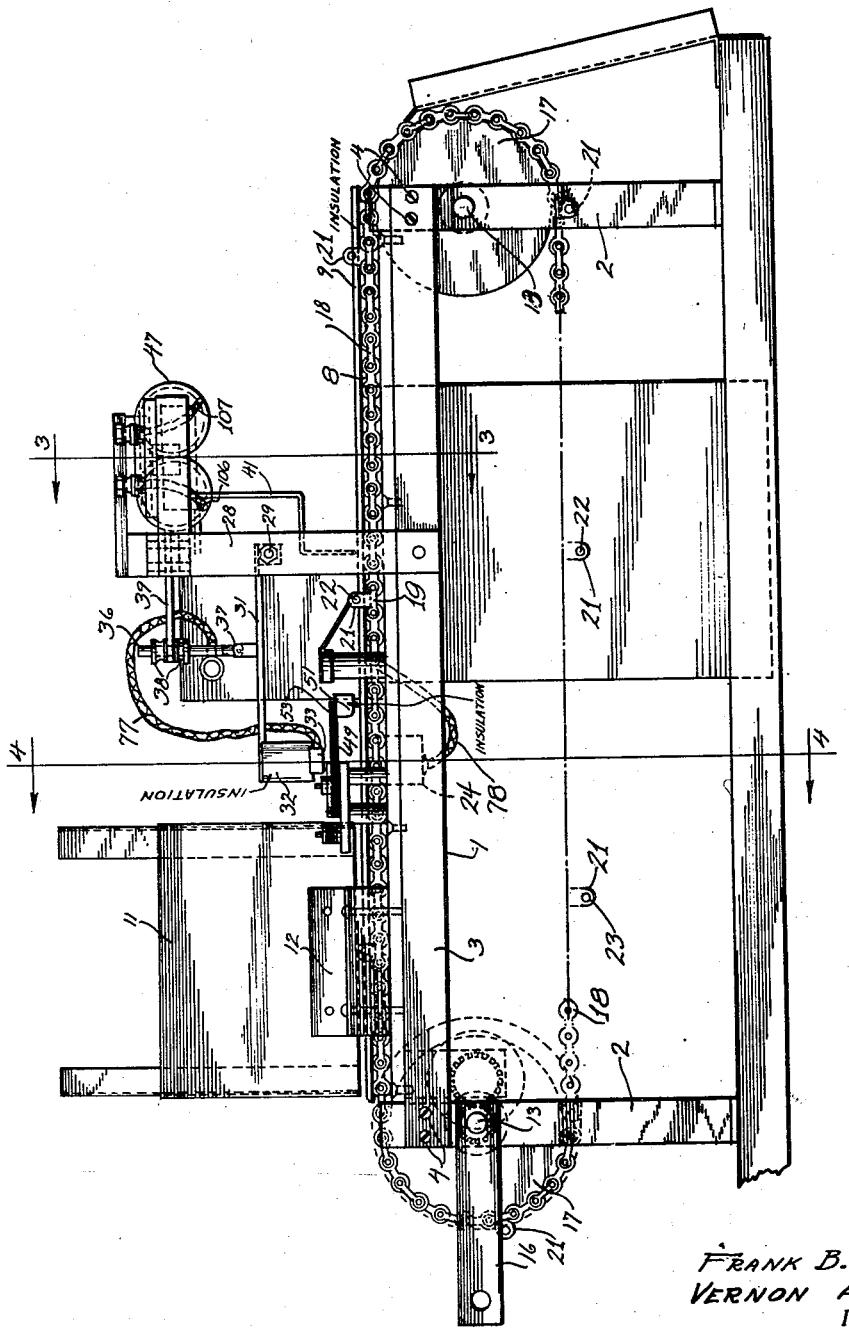

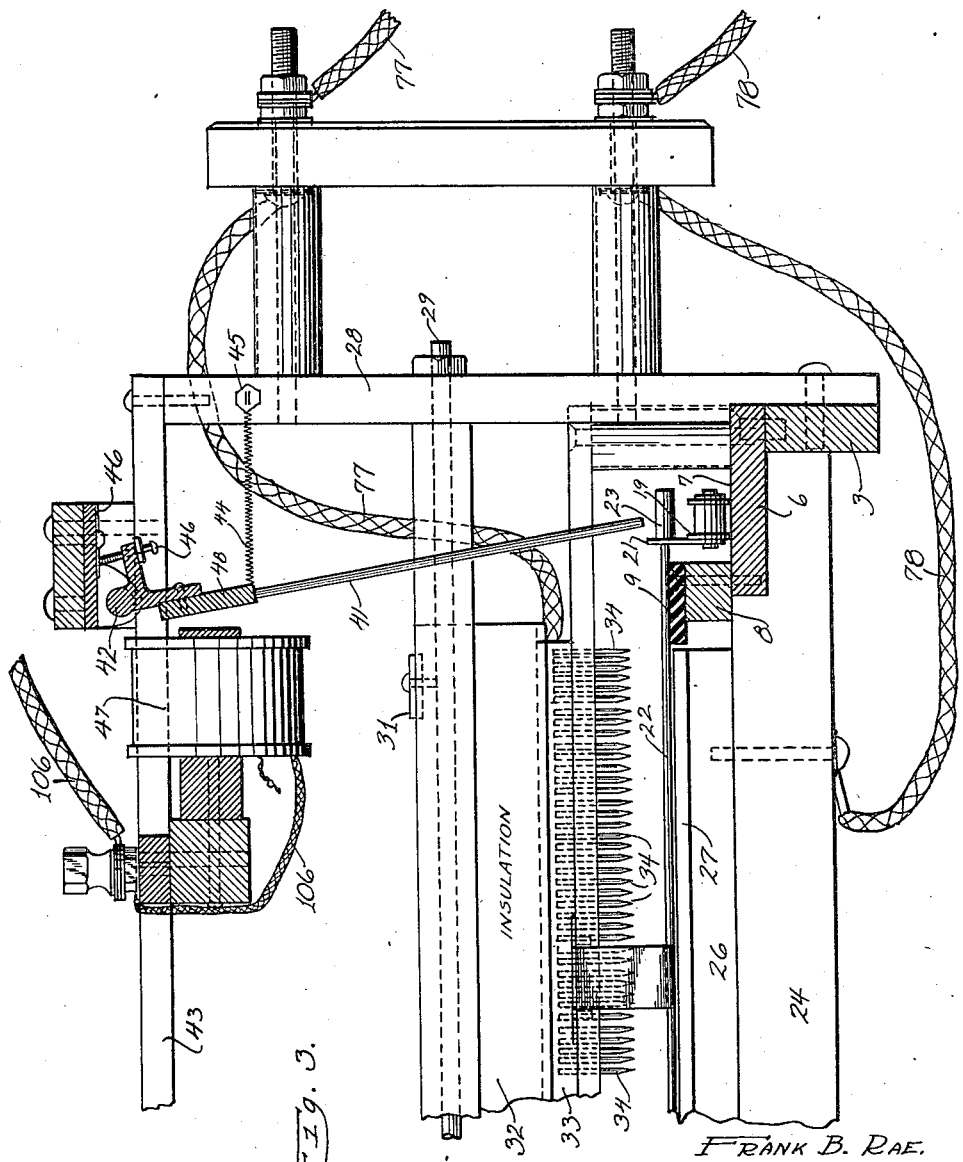

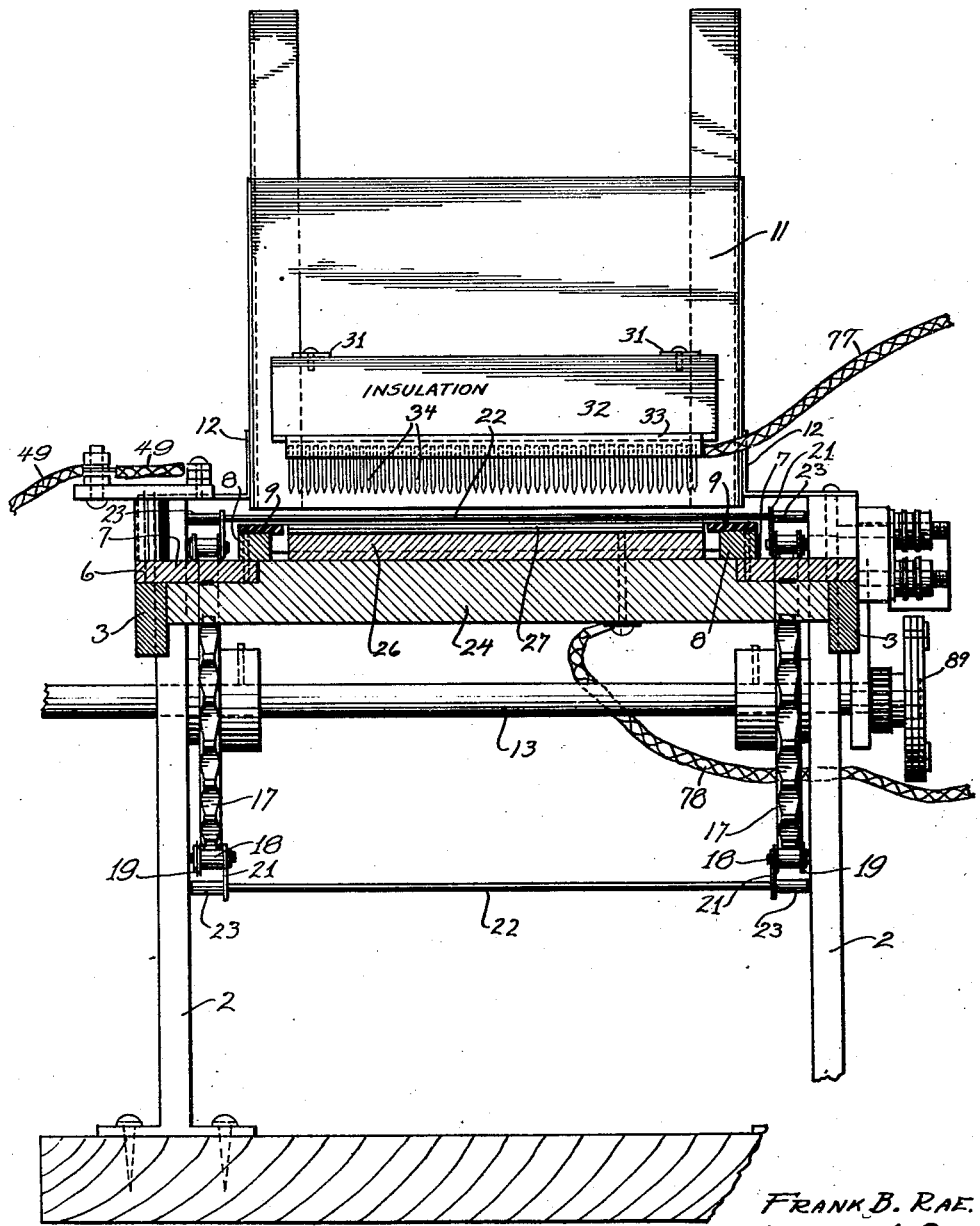

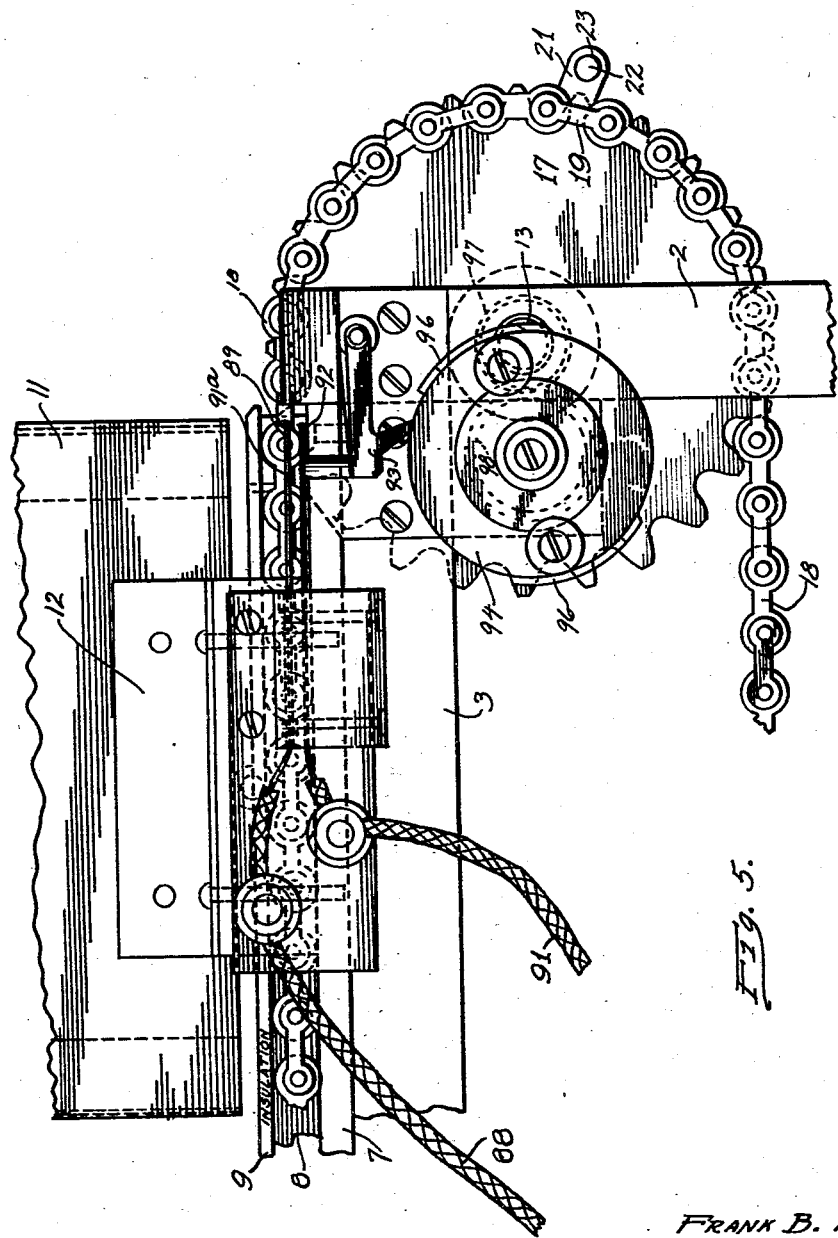

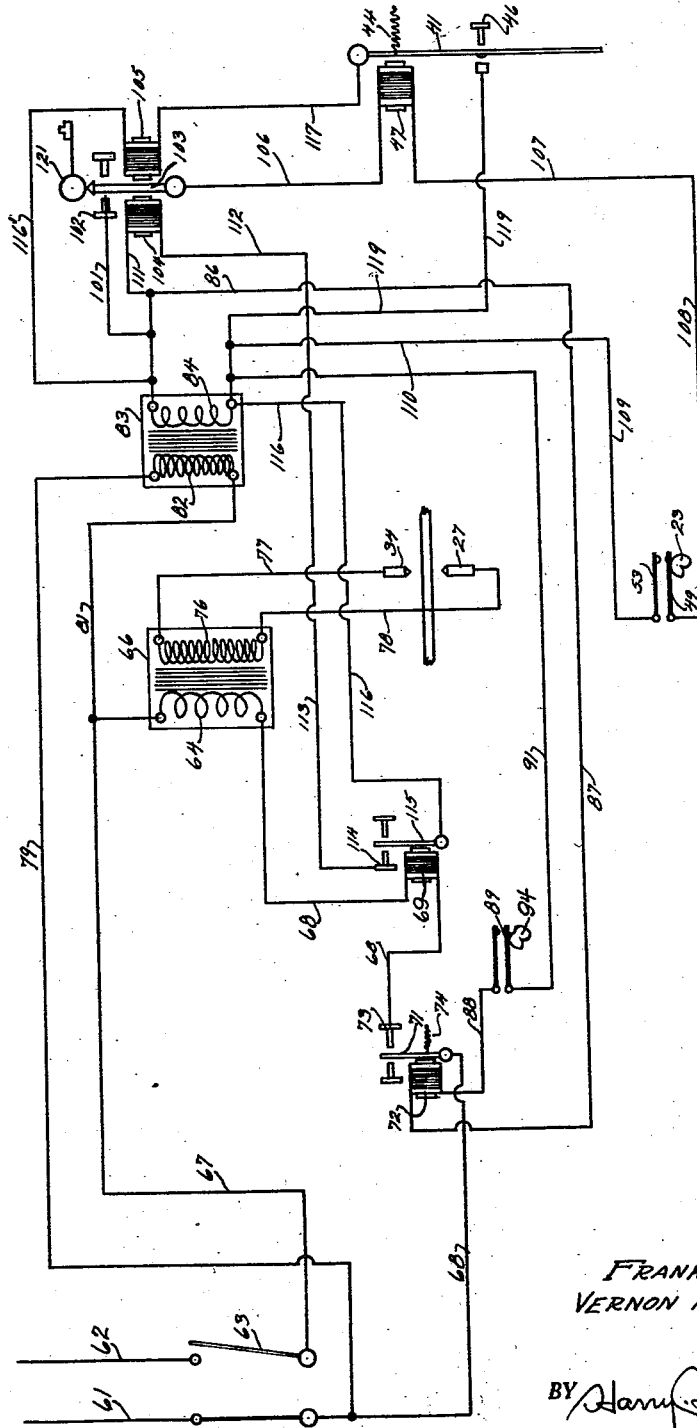

1,692,700

UNITED STATES PATENT OFFICE.

FRANK B. RAE AND VERNON A. SMITH, OF BERKELEY, CALIFORNIA, ASSIGNORS TO WESTERN LUMBER MANUFACTURING CO., INCORPORATED, OF SAN FRANCISCO, CALIFORNIA.

MACHINE FOR REJECTING FAULTY SEPARATORS.

Application filed February 2, 1927. Serial No. 165,293.

The present invention relates to improvements in a machine for rejecting faulty battery separators, and its particular object is to provide a comparatively simple machine through which a plurality of separators may be quickly passed in combination with means for ascertaining and indicating which of the separators are faulty, i. e., are deficient in dielectric strength, and in further combination with means for ejecting the separators found faulty so that only the good separators pass through the entire machine and are collected at the end thereof. It is particularly proposed to utilize, for finding the faulty separators, a high tension circuit with a spark gap through which all the separators pass, the spark gap being such that when a separator lacking in dielectric strength passes through the same, a spark will be forced across the gap while a good separator will prevent a spark from passing. It is further proposed to provide a means for ejecting the faulty separators and to utilize for this purpose a means becoming active in response to the passing of a spark across the gap. It is further proposed to utilize, in this connection, the fact that when a spark passes the gap of the high tension circuit, there will be an increase or a surge in the current of the primary circuit. The difference between the strength of current, while no spark passes, and that of the current, while a spark passes, is sufficiently pronounced to be relied on for operating a relay which causes, through various circuits, the ejecting device to become active. It is further proposed to provide means whereby the ejecting operation is delayed until the separator has passed the spark gap and reached an operative position relative to the ejecting device. It is further proposed, in the present invention, to arrange the various parts of the machine in such a manner that the high tension circuit is active only at such times, apart from the spark gap, as a separator is in operative position relative to the same.

Further objects and advantages of our invention will appear as the specification proceeds.

The preferred form of our invention is illustrated in the accompanying drawing, in which—

Figure 1 is a top plan view of our machine,
Figure 2 a side elevation thereof,

Figure 3 a sectional detail view taken along line 3—3 of Figure 2,

Figure 4 a cross section taken along line 4—4 of Figure 2,

Figure 5 a fragmentary enlarged side elevation of a front portion of the machine, and Figure 6 a wiring diagram showing the electrical connections.

While we have shown only the preferred forms of the invention, we wish to have it understood that various changes or modifications may be made within the scope of the claims hereto attached without departing from the spirit of the invention.

The frame 1 of our machine comprises the four legs 2, side beams 3 secured to the upper ends of the legs as shown at 4, and boards 6 secured thereon and extending inwardly to form ledges 7 extending throughout the length of the machine. On the inner edges of the ledges and spaced therefrom by members 8 are two guide ways 9 extending also throughout the length of the machine, and made of insulating material such as bakelite. At the front end of the machine, there is supported a rectangular hopper 11 by means of brackets 12 so as to be spaced from the guideways substantially by the thickness of one separator. This hopper is made to receive a stack of separators and is disposed relative to the guideways in such a manner that the entire stack rests on the guideways.

In the front and rear legs of the machine there are supported two transverse shafts 13 to one of which rotary motion may be imparted by any suitable means as, for instance, the crank 16. The two shafts have registering sprocket wheels 17 fixed thereto and two endless chains 18 pass over registering sprocket wheels transmitting motion from one set to the other and riding with their upper sections on the ledges 7 at opposite sides of the machine. Spaced links 19 of the chain are formed with symmetrically arranged lugs 21 adapted to support between the same transverse rods 22 riding on the guideways 9. The spacing between the lugs exceeds the length of a separator. As the sprocket wheel revolves, the rods 22 successively enter the space below the hopper 11 and engage with the lowermost separator of the stack so as to advance the same on the guideways. It will thus be seen that by this arrangement, the separators of the stack are caused to successively advance in spaced relation on the guideways. Externally of the lugs the rods 22 are formed with rollers 23 which will be referred to later.

Intermediate of the machine, there is supported a transverse member 24 which latter supports through a spacing member 26 a bar 27 of conducting material, the bar extending substantially from guideway to guideway and being substantially flush therewith. Rearwardly of this bar there is supported on the frame a transverse structure 28 in which is journalled a shaft 29 having levers 31 pivoted thereto, the levers supporting at their front ends an insulating block 32 and a transverse bar 33 having a plurality of teeth or points 34 extending downwardly therefrom in the formation of a transverse row and in opposing relation to the bar 27. The position of the levers 31 may be adjusted by means of a vertical rod 36 pivotally engaging with a projection carried by one of the levers as at 37 and capable of adjustment by two nuts 38 threaded thereon on opposite faces of a fixed member 39 fastened to the structure 28. The spacing between the teeth 34 and the bar 27 is such that a separator may be conveniently passed through the gaps formed by the same. The teeth 34 and the bar 27 form the electrodes of a high tension circuit and the position of the lever 31 is adjusted in such a manner that when a separator of proper dielectric strength passes through the gap, no spark will cross the same, while a faulty separator, deficient in dielectric strength, will allow a spark to jump across the gap.

After passing through the spark gap, each separator comes opposite a lever 41 pivoted as shown at 42 relative to the transverse member 33 of the structure 28 previously referred to. This lever is normally influenced by a spring 44 and an adjusting pin 46 to occupy the position indicated in Figure 3, slanting downwardly with its point just above one of the chains 18 so as to strike a separator riding on the guideways 9 from the side when swung inwardly.

The lever 41 is caused to swing inwardly by means of an electro-magnet 47 consisting of two coils, the lever being the extension of a transverse bar 48 forming an armature for the electro-magnet. It will be seen that in this manner, when the electro-magnet 47 is energized, the lever 41 strikes the separator which happens to be opposite the same and pushes the same off the guideway to drop downwardly to the center of the machine and to be carried off by any suitable conveyor, not shown in the drawing.

It should be observed in this connection that in accordance with the object of the present invention, the energizing of the electro-magnet 47 depends on two circumstances, namely—the passing of a faulty separator through the spark gap and the advance of the said separators into operative position relative to the lever 41. It should be further observed that in accordance with the present invention, one of the instrumentalities rendering the electro-magnet 47 active is the surge in a primary circuit caused by the jumping of a spark across a gap while the other instrumentality is the advance of the separators into operative position and, more particularly, the passing of a contact element 49 with an insulating block 51 over one of the rollers 23 on the rods 22 previously referred to. Whenever a separator pushed by the rods 22 reaches an operative position relative to the lever 41, the block 51 of the contact 49 rides over the roller 23 and is made to close a switch comprising a second contact member 53.

The electrical connections will be more readily understood by reference to the wiring diagram of Figure 6. The two line wires are indicated at 61 and 62 with a master switch 63 incorporated therein. The line wires are preferably of a voltage of 110 and connect with the primary 64 of a transformer 66 through the wires 67 and 68. The latter wire has connected therein the winding of a magnet 69 and the armature 71 of an electro-magnet 72, the armature opening the circuit of the primary at 73 when attracted by the electro-magnet 72 and closing the primary circuit under the influence of a spring 74 when the electro-magnet 72 is de-energized.

The transformer 66 steps up the voltage to preferably eleven thousand volts and the secondary 76 of the transformer is connected to the electrodes 34 and 27 through the wires 77 and 78, it being understood that the electrode 34 represents the teeth of the upper bar and the electrode 27 the lower bar forming the spark gap, as previously described.

The line wires 61 and 62 are also connected through wires 79 and 81 to the primary 82 of a step down transformer 83 which reduces the pressure in the secondary 84 preferably to six volts.

The secondary of the step down transformer 83 is connected into four different circuits, namely—(1) a circuit comprising the wires 86, 87, the windings of the electro-magnet 72, the wire 88, the switch 89, and the wire 91. The switch 89 is of the rotary type and is shown in Figure 5 as comprising two contacts 91ᵃ and 92, the latter being actuated by a pawl 93 riding on the surface of a disc 94 which latter is provided with two cam faces 96 forcing the contacts together when the pawl is lifted by the same. Revolving motion is imparted to the disc through gear wheels 97 and 98 from one of the shafts 13. The cam faces 96 are disposed in such a manner as to close the switch at 89 whenever no separator is in operative position relative to the spark gap. (2) A circuit comprising the wire 101, a stationary contact 102, the armature 103, pivoted between two magnets 104 and 105, the wire 106, the electro-magnet 47, the wire 107, the wire 108, the contacts 49 and 53, and the wires 109 and 110. (3) A circuit comprising the wire 111, the electro-magnet 104, the wires 112 and 113, the stationary contact 114, the armature 115 of the electro-magnet 69, and the wire 116. (4) The wire 116', the electro-magnet 105, the wire 117, the armature 41 of the magnet 47, and the return wire 119.

The manner in which the various circuits operate upon closing of the master switch 63 is as follows: The primary circuit of the transformer 66 is normally closed due to the action of the spring 74, but is opened by the electro-magnet 72 of the low voltage circuit when the switch is closed at 89. The action of the latter switch, which has been described in detail in connection with Figure 5, is such that it opens the switch 73 whenever there is no separator in operative relation to the spark gap. When a faultless separator passes through the gap, no spark occurs, and the current in the primary of the transformer 66 is too weak to cause the magnet 69 to attract the armature 115, but when a faulty separator passes through the gap so that a spark jumps across the same, the current in the primary circuit increases and becomes sufficiently strong to cause the electro-magnet 69 to attract the armature 115 and to thereby close the circuit including the electro-magnet 104. The latter attracts the armature 103 and brings the same in contact with the stationary contact 102, thereby closing one of the openings in the circuit containing the electro-magnet 47. This circuit, however, is still open at 49 and remains in this condition until the separator has passed the spark gap and reached an operative position relative to the lever 41 at which time the block 51 riding over the roller 23 brings the contacts 49 and 53 together so as to make the circuit complete. It should be understood that the armature 103 is held against the stationary contact 102 by a special locking device 121, known in the art as a jockey wheel. When the circuit of the electro-magnet 47 is closed, the latter attracts the lever 41 and the lever swings against the separator and throws the same off the guideway.

When the lever 41 reaches the end of its stroke, it closes the circuit of the magnet 105 by making contact with the terminal of the wire 119, which causes the armature 103 to be drawn away from the magnet 104, thereby restoring the circuit of the actuating magnet 47 to its original condition. It is understood, of course, that the contacts 49 and 53 separate as soon as the block 51 drops off the roller 23. The lever 41 is returned to its position by the spring 44.

The other circuits have in the meantime also been reduced to their original condition by the action of the rotary switch 94 which closes the switch at 89 when the separator leaves the gap or preferably slightly before that time, whereby the electro-magnet 72 is energized and draws the armature 71 toward the same which opens the primary circuit of the transformer 66. This also de-energizes the electro-magnet 69 and allows the lever 115 to swing back for de-energizing the electro-magnet 104, so that at the time the ejection of the separator takes place, the lever 103 is held to the stationary contact 102 not by the action of the electro-magnet 104 but by the jockey wheel 121.

We claim:

1. In a machine for rejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine and means timed relative to the advance of said separator utilizing the change of current in the primary for rendering the said means active.

2. In a machine for rejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine and an operative connection between the primary circuit and the said advancing means allowing a change in the primary circuit current to render the said ejecting means active.

3. In a machine for ejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine, an electric circuit rendering said means active having a switch therein and means actuated by said advancing means allowing a change in the primary circuit current to close said switch.

4. In a machine for ejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine, an electric circuit rendering said means active having a switch therein, a relay circuit adapted to close the switch and means timed relative to the advance of the separator allowing a change in the primary circuit current to render the relay circuit active.

5. In a machine for ejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine subject to two control elements, means utilizing the change of current in the primary circuit operating one of the control elements and means timed relative to the advance of the separator operating the second control elements for rendering the ejecting means active when a faulty separator has reached a definite position.

6. In a machine for ejecting faulty separators, a primary circuit, a high tension secondary circuit having a spark gap therein, means for advancing a separator to pass through the spark gap, the spark gap being arranged to allow a spark to jump thereacross when a defective part of the separator passes therethrough whereby a change in current is produced in the primary circuit, means for ejecting the faulty separator from the machine including an electric circuit having two switches therein, means utilizing the change of current in the primary circuit for closing one of the switches and means timed relative to the advance of the separator operating the second switch for rendering the ejecting means active when a faulty separator has reached a definite position.

7. A device as defined in claim 6 in which the ejecting means has means associated therewith to open the first switch during the ejecting action.

8. In a machine of the character described, means for stacking a plurality of separators, a guideway, means for successively advancing individual separators on the guideway, a primary circuit, a secondary circuit having electrodes mounted above and below the advancing separator and adapted to force a spark through the gap between the electrodes when the interposed separator is deficient in dielectric strength and means for making and breaking one of the circuits in timed relation to the advance of the separators.

9. In a machine of the character described, means for stacking a plurality of separators, a guideway, means for successively advancing individual separators on the guideway, a primary circuit, a secondary circuit having electrodes mounted above and below the advancing separator and adapted to force a spark through the gap between the electrodes when the interposed separator is deficient in dielectric strength and a rotary switch for making and breaking one of the circuits in timed relation to the advance of the separators.

10. In a machine of the character described, a guideway, means for successively advancing separators thereon, a high tension circuit having electrodes mounted so that the separators pass therebetween and allow a spark to be forced through faulty parts of a separator, a lever pivoted at a distance from the electrodes in operative relation to the guideway for ejecting faulty separators, an electromagnet operating said lever and a circuit associated with the electro-magnet made to become active in response to the passing of a spark, when a faulty separator has reached a definite position.

11. In a machine of the character described, a guideway, endless chains moving parallel with the guideway for advancing separators thereon, a lever pivoted for motion relative to the guideway for ejecting separators therefrom and means responsive to the passing of faulty separators for rendering the lever active, and means on said endless chain for actuating said responsive means.

12. A machine as defined in claim 11 in which the latter means comprise a high tension circuit forming a spark gap through which the separators pass and made to force a spark across the gap when the separator is lacking in dielectric strength.

13. The method of rejecting faulty separators which consists in subjecting each separator individually to the strain of a high tension current adapted to force a spark through a separator deficient in dielectric strength and in causing the surge caused by the passing of the spark to be instrumental in rendering an ejection device active, when said separator has reached a definite position.

14. The method of rejecting faulty separators which consists in subjecting each separator individually to the strain of a high tension current adapted to force a spark through a separator deficient in dielectric strength and in causing the surge caused by the passing of the spark to be instrumental in rendering an ejection device active, while delaying the ejecting operation until the separator has been freed from the influence of the high tension current.

In testimony whereof we affix our signatures.

FRANK B. RAE.
VERNON A. SMITH.